US00RE38583E1

(19) United States
(12) Reissued Patent
Schlossnikl et al.

(10) Patent Number: US RE38,583 E
(45) Date of Reissued Patent: Sep. 14, 2004

(54) PROCESS FOR THE PRODUCTION OF CELLULOSIC MOULDED BODIES

(75) Inventors: Christian Schlossnikl, Vocklabruck (AT); Peter Gspaltl, Grambach (AT); Johann Kalleitner, Schörfling (AT); Gerold Riedl, Pfaffing (AT); Andreas Schweigart, Georgen (AT)

(73) Assignee: Lenzing Aktiengesellschaft, Lenzing (AT)

(21) Appl. No.: 09/907,561

(22) Filed: May 23, 2001

Related U.S. Patent Documents

Reissue of:
(64) Patent No.: 6,165,401
Issued: Dec. 26, 2000
Appl. No.: 09/221,880
Filed: Dec. 28, 1998

U.S. Applications:
(63) Continuation-in-part of application No. PCT/AT98/00109, filed on Apr. 24, 1998.

(30) Foreign Application Priority Data

Apr. 25, 1997 (AT) ..... A705/97
Oct. 23, 1997 (AT) ..... A1797/97

(51) Int. Cl.[7] ..... B29C 67/20
(52) U.S. Cl. ..... 264/154; 264/187; 264/210.4; 264/210.7; 264/289.6; 264/290.2
(58) Field of Search ..... 264/41, 154, 187, 264/203, 210.4, 210.7, 289.6, 290.2

(56) References Cited

U.S. PATENT DOCUMENTS

| | | | | |
|---|---|---|---|---|
| 2,179,181 | A | * | 11/1939 | Graenacher et al. |
| 2,698,967 | A | | 1/1955 | Reichel et al. |
| 3,657,115 | A | * | 4/1972 | Manjikian et al. ... 264/290.2 X |
| 4,246,221 | A | * | 1/1981 | McCorsley, III |
| 4,354,938 | A | * | 10/1982 | Walch et al. |
| 4,748,186 | A | | 5/1988 | Cullen et al. |
| 5,277,857 | A | * | 1/1994 | Nicholson et al. |
| 5,330,567 | A | * | 7/1994 | Zikeli et al. |
| 5,607,639 | A | * | 3/1997 | Zikeli et al. |
| 5,658,524 | A | | 8/1997 | Portnoy et al. |
| 6,177,035 | B1 | | 1/2001 | Schlossnikl et al. |

FOREIGN PATENT DOCUMENTS

| | | | | |
|---|---|---|---|---|
| AT | 405407 | B | | 8/1999 |
| DE | 2830685 | A1 | * | 2/1979 |
| DE | 2844163 | A1 | * | 5/1979 |
| DE | 19515137 | A1 | * | 10/1996 |
| DE | 4421482 | C2 | * | 4/1997 |
| EP | 0356419 | A2 | * | 2/1990 |
| EP | 0494851 | B1 | * | 7/1992 |
| EP | 0574870 | A1 | * | 12/1993 |
| EP | 0662283 | A2 | * | 7/1995 |
| EP | 0807460 | A1 | * | 11/1997 |
| GB | 689395 | | | 3/1953 |
| GB | 2001320 | A | * | 1/1979 |
| WO | WO-95/07811 | A1 | * | 3/1995 |
| WO | WO-97/24215 | A1 | * | 7/1997 |
| WO | WO-97/37392 | A1 | * | 10/1997 |
| WO | 9921700 | A1 | | 5/1999 |

OTHER PUBLICATIONS

Handbook of Plastics II, Theorie des Reckvorgangs, Hanser–Verlag, pp. 261–270 (1986).*
Eberhard Straude, Membranen und Membranprozesse, VCH Vers., pp. 18–19 (1992).*

* cited by examiner

*Primary Examiner*—Leo B. Tentoni
(74) *Attorney, Agent, or Firm*—Baker Botts LLP

(57) ABSTRACT

The invention relates to a process for the manufacture of cellulosic flat films and cellulosic membranes in the form of flat membranes whereby a solution of cellulose in an aqueous tertiary amine oxide is moulded in film form using an extrusion nozzle which has an oblong extrusion gap and is led into a precipitation bath via an air gap whereby the cellulosic flat film is formed in the precipitation bath, characterized in that the cellulosic flat film is stretched in the transverse direction after entering the precipitation bath.

29 Claims, No Drawings

PROCESS FOR THE PRODUCTION OF CELLULOSIC MOULDED BODIES

Matter enclosed in heavy brackets [ ] appears in the original patent but forms no part of this reissue specification; matter printed in italics indicates the additions made by reissue.

This application is a continuation-in-part of PCT application PCT/AP98/00109 filed Apr. 21, 1998 which is incorporated by reference herein.

BACKGROUND OF THE INVENTION

The present invention deals with a process for the manufacture of cellulosic moulded bodies, in particular cellulosic flat films and cellulosic membranes in the form of flat membranes whereby a solution of cellulose in an aqueous tertiary amine oxide is moulded in film form by means of an extrusion die, which as an oblong extrusion gap, and led through an air gap into a precipitation bath whereby the cellulosic flat film is formed in the precipitation bath.

From U.S. Pat. No. 2,179,181 it is known that tertiary amine oxides have the ability to dissolve cellulose and that cellulosic moulded bodies such as fibers can be won from these solutions as a result of precipitation/regeneration. A process for the production of solutions of this kind is for example known from EP-A-0 356 419. According to this publication first of all a suspension of cellulose is prepared in an aqueous tertiary amine oxide. The amine oxide contains up to 40 weight % water. The aqueous cellulose suspension is transferred into the solution in a thin film treatment apparatus.

From DE-A-28 44 163 it is known for the production of cellulose fibers that an air gap is provided between the spinning nozzle and the precipitation bath to achieve drawing at the nozzle. This nozzle drawing is necessary since the stretching of the filaments is made more difficult after the contact of the moulded spinning solution with the aqueous precipitation bath. In the precipitation bath the fibre structure set in the air gap is fixed.

A process for the production of cellulosic threads is, furthermore, known from DE-A-28 30 685 whereby a solution of cellulose is formed to filaments in a tertiary amine oxide in a warm condition, the filaments are cooled down with air and finally introduced to a precipitation bath to precipitate the dissolved cellulose. The surface of the spun filaments is, furthermore, moistened with water to reduce their tendency to stick to neighboring filaments.

From DE-A-195 15 137 a process is known for the production of flat films whereby first of all a tubular film is formed using a ring nozzle, said film being cut to flat films following washing and drying. When manufacturing the tubular films, the extruded tube is extended in the air gap both in the drafting direction and in the transverse direction. This happens as a result of gas pressure effective in the inside of the tube. The disadvantages of this process lie in the complicated design of the device to be used and in the washing and drying process which is more complex with tubular films than with flat films.

Processes for the manufacture of cellulosic tubular films are, moreover, well known from U.S. Pat. No. 5,277,857 and EP-A-0 662 283. According to these known processes a cellulose solution is formed to a tube via an extrusion nozzle with a ring-shaped extrusion gap, said tube being drawn over a cylindrical mandrel and introduced to a precipitation bath. In order that the extruded tube does not stick to the surface of the mandrel its surface is covered with a water film so that the inner side of the tube coagulates and slides over the cylindrical mandrel. According to EP-A-0 662 283 the tubular film is extended after washing by blowing in a gas.

DE-C-44 21482 describes a blowing process for the manufacture of oriented cellulosic films whereby the cellulose solution is extruded via a film blowing nozzle and an air gap downwards into a precipitation bath. It is mentioned that stretching can be performed transverse to the transport direction of the blown film via the gas pressure in the inside of the blown film and that the relation of mechanical longitudinal and transverse properties can be set.

A process and a device for the manufacture of cellulosic films, particularly of tubular films, is also known from WO-A-95/07811 of the applicant. In this respect the dissolved cellulose is cooled before it is brought into the precipitation bath by subjecting the heated solution to a stream of gas immediately after extruding.

From WO-A-97/24215 there is known a process for the production of an oriented cellulosic film in which a cellulosic solution is applied to a stretchable surface to which the solution sticks, the solution is then stretched by stretching the extendable surface and finally it is precipitated.

From EP-B-0 494 851 of the patent applicant there is known a process for the production of a cellulosic flat film in which a cellulosic solution is passed through a nozzle or gap, it is then led through an air gap and then coagulated in a precipitation bath and the coagulated flat film is stretched in the longitudinal direction.

With cellulosic membranes particularly in the form of flat membranes, i.e. membranes from a flat film, the permeability of the membranes is an important property. To solve certain separation tasks it is important to select membranes with the optimum permeability, pore size and pore structure for the respective separation task.

Dialysis membranes made of regenerated cellulose in the form of flat films, tubular films or hollow threads have been known for some time whereby the regeneration of the cellulose can take place by means of the cuoxam-process, the viscose process or by means of the hydrolysis of cellulose acetate. Depending upon the process used and the process conditions one obtains membranes with different dialysis properties.

U.S. Pat. No. 4,354,938 describes for example a process for the production of dialysis membranes according to the viscose process, in which a tubular moulded membrane is stretched in the transverse direction by between 40 and 120% by blowing up with air before drying, which leads to a membrane with a regular orientation in the longitudinal and transverse direction. When transferring the dried membranes in the wet state the membranes thus produced undergo a shrinkage in the longitudinal and transverse direction of 0.5–10%. The ultrafiltration values lie in the range of between 2.5 $ml/m^2$.h.mm Hg and 5.2 $ml/m^2$.h.mm Hg at a wet thickness of 184 $\mu$m to 45 $\mu$m.

In "membranes and membrane processes" by E. Staude, 1992, VCH Verlagsges.m.b.H. on page 19 it is described that the biaxial stretching of finished cellophase membranes leads to the enlargement of the pores, monoaxial stretching on the other hand leads to a reduction in the effective pore diameter.

However, the viscose process only offers limited possibilities to set membrane properties in a well aimed manner. Moreover, the recovery of the chemicals which accumulate in this process such as sodium sulphate and carbon bisulphide etc. is very expensive.

SUMMARY OF THE INVENTION

The present invention has as an object to provide a process for the production of cellulosic flat films with improved mechanical properties. Moreover, it is the object of the invention to provide a process for the production of cellulosic membranes in the form of flat membranes by means of which membranes with a permeability which is optimised for the individual separation task to be accomplished can be achieved.

This object is achieved by a process for the production of cellulosic flat films and cellulosic membranes in the form of flat membranes whereby a solution of cellulose in an aqueous tertiary amine oxide is moulded in the form of a film using an extrusion nozzle which has an oblong extrusion gap, said solution being led through an air gap into a precipitation bath whereby the cellulosic flat film is formed in the precipitation bath, and in which according to the invention the cellulosic flat film is stretched in the transverse direction after entering the precipitation bath.

The transverse stretching can thereby take place in the precipitation bath or at a later time. Under transverse stretching is understood a stretching in the direction of the width of the cellulosic flat film.

It is known that cellulose films made according to the viscose process can hardly be shaped at all after regenerating and can only be stretched in the transverse direction to a limited extent.

Surprisingly, in accordance with the invention it was shown that in the case of films manufactured according to the amine oxide process according to the generic term of claim 1, transverse stretching is also possible after the precipitation of the film-like moulded solution of cellulose. In this way cellulosic flat films are obtained with improved mechanical properties. The costly blowing up of a tubular moulded cellulosic solution in the air gap is thereby not necessary.

The transverse stretching of the films can be performed according to well known methods such as for example those used with thermoplastic films (as is for example described in the Handbook of Plastics Extrusion II, extrusion plants, Hanser-Verlag, 1986, 261–269), for example by conveyor belts or by clamping devices which are attached to endless belts respectively chains by the fact that the belts are led in divergent directions.

Preferably the cellulose solution is extruded using an extrusion die, which has an extrusion gap with a length of at least 40 cm. The cellulose solution can, however, also be extruded from an extrusion gap with a length of less than 40 cm which results in films with a lower width. The extrusion die preferably includes an extrusion section. The cellulose solution flows out from the extrusion section into the extrusion gap. The length of the extrusion section is preferably greater than 1 mm, most preferably from about 5 mm to about 20 mm.

According to one preferred embodiment of the process in accordance with the invention, the cellulosic flat film is stretched in the longitudinal direction in the air gap, preferably in a range of 0.2 to 5 times.

One further advantageous embodiment of the process according to the invention is characterized in that the cellulose flat film is first washed after precipitation and stretched after washing.

Surprisingly it has been shown that cellulosic flat films made using the process according to the invention can be stretched in the transverse direction in a washed state by up to 3.5 times their original width.

In accordance with one further preferred embodiment of the process in accordance with the invention the cellulosic flat film is first of all washed after precipitation and dried and after that the dry cellulosic flat film is moistened and stretched preferably by spraying with water. Surprisingly it was shown that cellulosic flat films treated in this way can be stretched by up to 3.5 times their original width in the transverse direction.

The process according to the invention has the advantage that by stretching the cellulosic flat film up to 3.5 times the original width in the transverse direction the mechanical properties of the film can be set in a wide range in the longitudinal and transverse direction.

Preferably N-Methylmorpholine-N-oxide (NMMO) is used as the tertiary amine oxide.

The advantages described above of the process in accordance with the invention apply in particular to a production in accordance with the invention of cellulosic membranes in the form of flat membranes.

In this respect the permeability of the membrane and thus also its ultrafiltration rate (UFR) can be influenced in particular by the selection of the speed at which the film-like moulded solution is drawn off in the air gap. In this respect it is shown that a lower draw-off speed increases the permeability and thus also the ultrafiltration rate of the membrane. By contrast the transverse stretching of the film after entering the precipitation bath increases the permeability of the membrane. Thus basic membrane properties can be controlled by the selection of draw-off speed and the transverse stretching of the film.

The invention also relates to the use of a cellulosic flat film made by the process in accordance with the invention as a package material, in particular for foodstuff, as a material for waste and carrier bags, as film for agricultural applications, as a film for diapers, as a substrate for compounds, as an office film, as a household film or as a membrane to separate substance mixtures.

DETAILED DESCRIPTION OF THE PREFERRED EMBODIMENTS

With the following examples the invention is described in greater detail. The cellulose solutions used were manufactured in accordance with the process described in EP-A-0 356 419. In all the examples the films were washed following precipitation of the cellulose and treated with glycerine (glycerine content of the dried film about 15 wt. %) and finally dried on a tenter frame, in which the films were fixed in the longitudinal and transverse direction. The properties listed in the examples were determined with the dried films, whereby the tenacity (longitudinal and transverse) and the longitudinal and transverse elongation were determined according to DIN 53457.

The ultrafiltration rate given in the examples is defined as the per time unit of the volume of the permeate passing through the membrane wall relative to the membrane area and test pressure.

$$UFR = \frac{V}{t \cdot A \cdot p} \frac{ml}{h \cdot m^2 \cdot mmHg}$$

V=volume of liquid (permeate) [ml]

t=time [h]

A=membrane area [$m^2$]

p=test pressure [mm Hg]The values for diffuse permabilities are determined by the increase of the straight line arrived at by plotting $\ln(c_t/c_o)$ against time.

$$\ln\frac{C_t}{C_o} = -\frac{A}{V}\cdot P_{diff}t$$

$c_o$=starting concentration $c_t$=concentration at time t

A=membrane area [$cm^2$]

V=dialysis volume [$cm^3$]

$P_{diff}$=diffuse permeability [cm/min]

t=time [min]

To directly compare the different membranes all the permeabilities were converted to a wet thickness of 75 μm, i.e. the corresponding times for reaching the balanced state were standardized to this thickness. For example if with a membrane with a thickness of 200 μm, the balanced state of NaCl-dialysis was reached after 100 hours, then this corresponds to a time of 100×75/200=37.5 hours for a membrane with a thickness of 75 μm.

EXAMPLE 1

(comparison)

A cellulose solution with a temperature of 85° C., containing 15.5 wt. % cellulose, 74.5 wt. % NMMO and 10.0 wt. % water, was extruded with a throughput of 37.8 kg/h by means of an oblong extrusion nozzle, which had an extrusion gap with a length of 40 cm and a width of 300 μm, through an air gap of 20 mm into a precipitation bath, comprising 80 wt % NMMO and 20 wt. % water.

The film-like moulded cellulose solution emerged from the nozzle at a speed of 4.2 mm/min and was drawn off with three times the emerging speed.

The flat film obtained had the following properties:

| | |
|---|---|
| Thickness: | 32 μm |
| Tenacity (longitudinal direction): | 177.1 N/mm$^2$ |
| Tenacity (transverse direction): | 62.3 N/mm$^2$ |
| Elongation in longitudinal direction: | 15.6% |
| Elongation in transverse direction: | 114.0% |
| UFR: | 3.5 ml/m.$^2$h. mm Hg |
| $P_{diff}$NaOH: | 2.5. $10^{-3}$ cm/min |
| $P_{diff}$NaCl: | 1.7. $10^{-3}$ cm/min |

EXAMPLE 2

The procedure was the same as in example 1 except that the flat film was stretched by 50% in the transverse direction on the tenter frame prior to drying.

The flat film obtained had the following properties:

| | |
|---|---|
| Thickness: | 21 μm |
| Tenacity (longitudinal direction): | 194.0 N/mm$^2$ |
| Tenacity (transverse direction): | 78.8 N/mm$^2$ |
| Longitudinal elongation: | 17.5% |
| Transverse elongation: | 70.3% |
| UFR: | 4.5 ml/m.$^2$h. mm Hg |
| $P_{diff}$NaOH: | 2.6.$10^{-3}$ cm/min |
| $P_{diff}$NaCl: | 2.3.$10^{-3}$ cm/min |

EXAMPLE 3

The procedure was the same as in example 1 except that the flat film was stretched by 75% in the transverse direction on the tenter frame prior to drying.

The flat film obtained had the following properties:

| | |
|---|---|
| Thickness: | 18 μm |
| Tenacity (in longitudinal direction): | 177.3 N/mm$^2$ |
| Tenacity (transverse direction): | 88.1 N/mm$^2$ |
| Elongation in longitudinal direction: | 17.5% |
| Elongation in transverse direction: | 52.6% |
| UFR: | 4.5 ml/m.$^2$h. mm Hg |
| $P_{diff}$NaOH: | 2.8. $10^{-3}$ cm/min |
| $P_{diff}$NaCl: | 2.5. $10^{-3}$ cm/min |

EXAMPLE 4

The procedure was the same as in example 1 except that the flat film was stretched by 100% in the transverse direction on the tenter frame prior to drying.

The flat film obtained had the following properties:

| | |
|---|---|
| Thickness: | 16 μm |
| Tenacity (longitudinal direction): | 181.5 N/mm$^2$ |
| Tenacity (transverse direction): | 114.7 N/mm$^2$ |
| Elongation in longitudinal direction: | 17.1% |
| Elongation in transverse direction: | 37.2% |
| UFR: | 5.1 ml/m.$^2$h. mm Hg |
| $P_{diff}$NaOH: | 3.2. $10^{-3}$ cm/min |
| $P_{diff}$NaCl: | 2.9. $10^{-3}$ cm/min |

EXAMPLE 5

The procedure was the same as in example 1 except that the flat film was stretched by 125% in the transverse direction on the tenter frame before drying.

The flat film obtained had the following properties:

| | |
|---|---|
| Thickness: | 14 μm |
| Tenacity (longitudinal direction): | 182.8 N/mm$^2$ |
| Tenacity (transverse direction): | 122.7 N/mm$^2$ |
| Elongation in longitudinal direction: | 20.0% |
| Elongation in transverse direction: | 36.8% |
| UFR: | 5.3 ml/m.$^2$h. mm Hg |
| $P_{diff}$NaOH: | 3.1. $10^{-3}$ cm/min |
| $P_{diff}$NaCl: | 2.8. $10^{-3}$ cm/min |

EXAMPLE 6

The procedure was the same as in example 1 except that the flat film was stretched by 175% in the transverse direction before drying on the tenter frame.

The flat film obtained had the following properties:

| | |
|---|---|
| Thickness: | 12 μm |
| Tenacity (longitudinal direction): | 138.0 N/mm$^2$ |
| Tenacity (transverse direction): | 131.5 N/mm$^2$ |
| Elongation in longitudinal direction: | 13.9% |
| Elongation in transverse direction: | 27.9% |
| UFR: | 5.5 ml/m.$^2$h. mm Hg |
| $P_{diff}$NaOH: | 3.1.$10^{-3}$ cm/min |
| $P_{diff}$NaCl: | 3.1.$10^{-3}$ cm/min |

EXAMPLE 7

(comparison)

A cellulose solution with a temperature of 110° C., containing 15.0 wt. % cellulose, 74.5 wt. % NMMO and 10.5 wt. % water, was extruded with a throughput of 37.8 kg/h using an oblong extrusion nozzle, which had an extrusion gap with a length of 40 cm and a width of 300 $\mu$m, through an air gap of 20 mm into a precipitation bath comprising 80 wt. % NMMO and 20 wt. % water.

The film-like moulded cellulose solution emerged from the nozzle at a speed of 4.2 m/min and was drawn off at the same speed. This means that the flat film was not stretched in the longitudinal direction in the air gap.

The flat film obtained had the following properties:

| | |
|---|---|
| Thickness: | 71 $\mu$m |
| Tenacity (longitudinal direction): | 190.6 N/mm$^2$ |
| Tenacity (transverse direction): | 107.2 N/mm$^2$ |
| Elongation in longitudinal direction: | 19.9% |
| Elongation in transverse direction: | 70.3% |
| UFR: | 5.6 ml/m.$^2$h. mm Hg |
| $P_{diff}$NaOH: | 5.2.10$^{-3}$ cm/min |
| $P_{diff}$NaCl: | 4.3.10$^{-3}$ cm/min |

EXAMPLE 8

The procedure was the same as in example 7 except that the flat film was stretched on the tenter frame by 100% in the transverse direction prior to drying.

The flat film obtained had the following properties:

| | |
|---|---|
| Thickness: | 36 $\mu$m |
| Tenacity (longitudinal direction): | 185.0 N/mm$^2$ |
| Tenacity (transverse direction): | 169.1 N/mm$^2$ |
| Elongation in longitudinal direction: | 26.6% |
| Elongation in transverse direction: | 29.2% |
| UFR: | 5.9 ml/m.$^2$h. mm Hg |
| $P_{diff}$NaOH: | 5.7.10$^{-3}$ cm/min |
| $P_{diff}$NaCl: | 4.6.10$^{-3}$ cm/min |

EXAMPLE 9

The procedure was the same as in example 7, except that the flat film was stretched 200% in the transverse direction prior to drying on the tenter frame.

The flat film obtained had the following properties:

| | |
|---|---|
| Thickness: | 24 $\mu$m |
| Tenacity (longitudinal direction): | 139.6 N/mm$^2$ |
| Tenacity (transverse direction): | 179.3 N/mm$^2$ |
| Elongation in longitudinal direction: | 36.2% |
| Elongation in transverse direction: | 20.0% |
| UFR: | 6.2 ml/m.$^2$h. mm Hg |
| $P_{diff}$NaOH: | 5.9 10$^{-3}$ cm/min |
| $P_{diff}$NaCl: | 5.0 10$^{-3}$ cm/min |

EXAMPLE 10

(comparison)

A cellulose solution with a temperature of 85° C., containing 15.5 wt. % cellulose, 74.5 wt. % NMMO and 10.0 wt. % water, was extruded with a throughput of 37.8 kg/h by means of an oblong extrusion nozzle, which had an extrusion gap with a length of 40 cm and a width of 300 $\mu$m, through an air gap of 20 mm into a precipitation bath, comprising a 80 wt. % NMMO and 20 wt. % water solution.

The film-like moulded cellulose solution emerged from the nozzle at a speed of 4.2 m/min and was drawn off at the same speed. This means that the flat film was not stretched in the air gap in the longitudinal direction.

The flat film obtained had the following properties:

| | |
|---|---|
| Thickness: | 67 $\mu$m |
| Tenacity (longitudinal direction): | 224.1 N/mm$^2$ |
| Tenacity (transverse direction): | 165.1 N/mm$^2$ |
| Elongation in longitudinal direction: | 25.6% |
| Elongation in transverse direction: | 54.3% |
| UFR: | 5.5 ml/m.$^2$h. mm Hg |
| $P_{diff}$NaOH: | 5.2.10$^{-3}$ cm/min |
| $P_{diff}$NaCl: | 4.2.10$^{-3}$ cm/min |

EXAMPLE 11

The procedure was the same as in example 10 except that the flat film was moistened again after drying on the tenter frame and was stretched on the tenter frame by 100% in the transverse direction.

The flat film obtained had the following properties in the dry state:

| | |
|---|---|
| Thickness: | 34 $\mu$m |
| Tenacity (longitudinal direction): | 171.1 N/mm$^2$ |
| Tenacity (transverse direction): | 171.9 N/mm$^2$ |
| Elongation in longitudinal direction: | 36.6% |
| Elongation in transverse direction: | 40.1% |
| UFR: | 5.8 ml/m.$^2$h. mm Hg |
| $P_{diff}$NaOH: | 5.9.10$^{-3}$ cm/min |
| $P_{diff}$NaCl: | 4.4.10$^{-3}$ cm/min |

EXAMPLE 12

The procedure was the same as in example 10 except that the flat film was moistened again after drying on the tenter frame and was stretched by 200% in the transverse direction on the tenter frame.

The flat film obtained had the following properties in the dry state:

| | |
|---|---|
| Thickness: | 22 $\mu$m |
| Tenacity (longitudinal direction): | 132.2 N/mm$^2$ |
| Tenacity (transverse direction): | 190.5 N/mm$^2$ |
| Elongation in longitudinal direction: | 34.4% |
| Elongation in transverse direction: | 31.8% |
| UFR: | 6.0 ml/m.$^2$h. mm Hg |
| $P_{diff}$NaOH: | 5.6.10$^{-3}$ cm/min |
| $P_{diff}$NaCl: | 4.9.10$^{-3}$ cm/min |

EXAMPLE 13

A cellulose solution with a temperature of 85° C., containing 15.0 wt. % cellulose, 74.5 wt. % NMMO and 10.5 wt. % water, was extruded with a throughput of 37.8 kg/h using an oblong extrusion nozzle, which displayed an extrusion gap with a length of 40 cm and a width of 300 $\mu$m, through an air gap of 20 mm into a precipitation bath, comprising 80 wt. % of NMMO and 20 wt. % water.

The film-like moulded cellulose solution emerged from the nozzle with a speed of 4.2 m/min and was drawn off at the same speed. This means that the flat film was not stretched in the longitudinal direction in the air gap.

The dry flat film was immersed in water for 2 minutes and afterwards was stretched on the tenter frame by 25% in the transverse direction.

The film obtained had the following properties in the dry state:

| | |
|---|---|
| Thickness: | 49 $\mu$m |
| Tenacity (longitudinal direction): | 266.6 N/mm$^2$ |
| Tenacity (transverse direction): | 163.1 N/mm$^2$ |
| Elongation in the longitudinal direction: | 20.2% |
| Elongation in the transverse direction: | 61.3% |
| UFR: | 5.5 ml/m$^2$.h.mm Hg |
| $P_{diff}$NaOH: | 5.3.10$^{-3}$ cm/min |
| $P_{diff}$NaCl: | 4.2.10$^{-3}$ cm/min |

EXAMPLE 14

The procedure was the same as in example 13 except that the film immersed in the water was stretched on the tenter frame by 75% in the transverse direction.

The flat film obtained had the following properties in the dry state:

| | |
|---|---|
| Thickness: | 37 $\mu$m |
| Tenacity (longitudinal direction): | 244.4 N/mm$^2$ |
| Tenacity (transverse direction): | 195.5 N/mm$^2$ |
| Elongation in the longitudinal direction: | 24.9% |
| Elongation in the transverse direction: | 37.5% |
| UFR: | 5.6 ml/m$^2$.h.mm Hg |
| $P_{diff}$NaOH: | 5.3.10$^{-3}$ cm/min |
| $P_{diff}$NaCl: | 4.3.10$^{-3}$ cm/min |

EXAMPLE 15

The procedure was the same as in example 13 except that the flat film immersed in the water was stretched on the tenter frame by 100% in the transverse direction.

The film obtained had the following properties in the dry state:

| | |
|---|---|
| Thickness: | 32 $\mu$m |
| Tenacity (longitudinal direction): | 235.8 N/mm$^2$ |
| Tenacity (transverse direction): | 232.9 N/mm$^2$ |
| Elongation in the longitudinal direction: | 26.9% |
| Elongation in the transverse direction: | 35.1% |
| UFR: | 5.8 ml/m$^2$.h.mm Hg |
| $P_{diff}$NaOH: | 5.7. 10$^{-3}$ cm/min |
| $P_{diff}$NaCl: | 4.5. 10$^{-3}$ cm/min |

EXAMPLE 16

The procedure was the same as in example 13 except that the flat film immersed in the water was stretched by 250% in the transverse direction.

The flat film obtained had the following properties in the dry state:

| | |
|---|---|
| Thickness: | 18 $\mu$m |
| Tenacity (longitudinal direction): | 187.6 N/mm$^2$ |
| Tenacity (transverse direction): | 265.2 N/mm$^2$ |
| Elongation in the longitudinal direction: | 38.0% |
| Elongation in the transverse direction: | 31.1% |
| UFR: | 6.3 ml/m$^2$.h.mm Hg |
| $P_{diff}$NaOH: | 6.10$^{-3}$ cm/min |
| $P_{diff}$NaCl: | 5.2.10$^{-3}$ cm/min |

EXAMPLE 17

(comparison)

A cellophane film manufactured according to the viscose process was moistened and dried on the tenter frame without stretching.

The film obtained had the following properties in the dry state:

| | |
|---|---|
| Thickness: | 30 $\mu$m |
| Tenacity (longitudinal direction): | 176.1 N/mm$^2$ |
| Tenacity (transverse direction): | 81.9 N/mm$^2$ |
| Elongation in the longitudinal direction: | 13.8% |
| Elongation in the transverse direction: | 31.8% |

EXAMPLE 18

(comparison)

A cellophane film produced according to the viscose process was moistened and stretched in the transverse direction on the tenter frame by 50%. It was not possible to achieve a higher transverse stretching than 50% with the cellophane film without the film being torn.

The film obtained had the following properties in the dry state:

| | |
|---|---|
| Thickness: | 21 $\mu$m |
| Tenacity (longitudinal direction): | 159.0 N/mm$^2$ |
| Tenacity (transverse direction): | 113.1 N/mm$^2$ |
| Elongation in the longitudinal direction: | 12.8% |
| Elongation in the transverse direction: | 19.7% |

EXAMPLE 19

A cellulose solution with a temperature of 110° C., containing 14.2 wt. % Cellulose, 76.2 wt. % NMMO and 9.6 wt. % water, was extruded by means of a longitudinal extrusion nozzle, which displayed an extrusion gap with a length of 40 cm and a width of 500 $\mu$m, with a throughput of 75.6 kg/h through an air gap of 3 cm vertically downwards into a regenerating bath, comprising a 98 wt. % water and 2 wt. % NMMO solution.

The film-like moulded cellulose solution emerged from the nozzle at a speed of 5.0 m/min and was drawn off at three times that speed and stretched in the precipitation bath in the transverse direction by 50%.

The flat film obtained displayed the following properties:

| | |
|---|---|
| Width: | 55.0 cm |
| Thickness: | 33.0 $\mu$m |
| Tenacity (longitudinal direction): | 151.3 N/mm$^2$ |
| Tenacity (transverse direction): | 135.6 N/mm$^2$ |
| Elongation in longitudinal direction: | 16.4% |
| Elongation in transverse direction: | 37.3% |
| UFR: | 4.7 ml/m$^2$.h.mm Hg |
| $P_{diff}$NaOH: | 2.6.10$^{-3}$ cm/min |
| $P_{diff}$NaCl: | 2.4.10$^{-3}$ cm/min |

EXAMPLE 20

A cellulose solution with a temperature of 85° C., containing 14.2 wt. % cellulose, 76.3 wt. % NMMO and 9.5 wt. % water, was extruded by means of a longitudinal extrusion nozzle, which had an extrusion gap with a length of 40 cm and a width of 500 μm, with a throughput of 75.6 kg/h through an air gap of 1 cm vertically downwards into a precipitation bath, comprising a 98 wt. % water and 2 wt. % NMMO solution.

The film-like moulded cellulose solution emerged from the nozzle with a speed of 5.0 m/min and was drawn off with the same speed. After the precipitation bath the flat film was stretched in the transverse direction by 100%.

The flat film obtained displayed the following properties:

| | |
|---|---|
| Width: | 74.0 cm |
| Thickness: | 45.0 μm |
| Tenacity (longitudinal direction): | 119.1 $N/mm^2$ |
| Tenacity (crosswise direction): | 184.6 $N/mm^2$ |
| Elongation in longitudinal direction: | 42.0% |
| Elongation in crosswise direction: | 32.0% |
| UFR: | 6.1 $ml/m^2$.h.mm Hg |
| $P_{diff}$NaOH: | $5.7.10^{-3}$ cm/min |
| $P_{diff}$NaCl: | $4.8.10^{-3}$ cm/min |

We claim:

1. Process for the manufacture of cellulose flat films comprising:

providing a solution of cellulose in an aqueous tertiary amine oxide, conveying the solution through an extrusion nozzle having an oblong extrusion gap whereby the solution is in the form of a film, conveying the extruded solution through an air gap into a precipitation bath, whereby a cellulose flat film is formed, and stretching the cellulosic flat film in the transverse direction.

2. Process according to claim 1 further comprising stretching the cellulosic flat film in the longitudinal direction in the air gap wherein the film is stretched in the range of 0.2 to 5 times.

3. Process according to claim 1 or claim 2 further comprising washing the cellulose flat film prior to stretching the cellulose flat film.

4. Process according to claim 1 or claim 2 further comprising washing the cellulose flat film, drying the cellulosic flat film, and moistening the dried cellulosic flat film prior to stretching.

5. Process according to claim 1 or claim 2 further comprising washing the cellulose flat film in the air gap wherein the film is stretched up to 3.5 times.

6. Process according to claim 3 comprising stretching the cellulosic flat film in the air gap wherein the film is stretched up to 3.5 times.

7. Process according to claim 4 comprising stretching the cellulosic flat film in the air gap wherein the film is stretched up to 3.5 times.

8. Process according to claim 1 or claim 2 wherein the tertiary amine oxide is N-methylmorpholine-N-oxide.

9. Process according to claim 3 wherein the tertiary amine oxide is N-methylmorpholine-N-oxide.

10. Process according to claim 4 wherein the tertiary amine oxide is N-methylmorpholine-N-oxide.

11. Process according to claim 5 wherein the tertiary amine oxide is N-methylmorpholine-N-oxide.

12. Process according to claim 6 wherein the tertiary amine oxide is N-methylmorpholine-N-oxide.

13. Process according to claim 7 wherein the tertiary amine oxide is N-methylmorpholine-N-oxide.

14. Process for manufacturing a cellulosic flat membrane having a desired permeability comprising the steps of:

providing a solution of cellulose in an aqueous tertiary amine oxide, conveying the solution through an extrusion nozzle having an oblong extrusion gap whereby the solution is in the form of a film, conveying the extruded solution through an air gap into a precipitation bath, whereby a cellulose flat film is formed, stretching the cellulosic flat film in the transverse direction to produce a cellulosic flat membrane having a desired permeability.

15. Process according to claim 14 further comprising stretching the cellulosic flat film in the longitudinal direction in the air gap wherein the film is stretched in the range of 0.2 to 5 times.

16. Process according to claim 14 or claim 15 further comprising washing the cellulose flat film prior to stretching the cellulose flat film.

17. Process according to claim 14 or claim 15 further comprising washing the cellulose flat film, drying the cellulosic flat film, and moistening the dried cellulose flat film prior to stretching.

18. Process according to claim 14 or claim 15 comprising stretching the cellulosic flat film in the air gap wherein the film is stretched up to 3.5 times.

19. Process according to claim 16 comprising stretching the cellulosic flat film in the air gap wherein the film is stretched up to 3.5 times.

20. Process according to claim 17 comprising stretching the cellulose flat film in the air gap wherein the film is stretched up to 3.5 times.

21. Process according to claim 14 or claim 15 wherein the tertiary amine oxide is N-methylmorpholine-N-oxide.

22. Process according to claim 16 wherein the tertiary amine oxide is N-methylmorpholine-N-oxide.

23. Process according to claim 17 wherein the tertiary amine oxide is N-methylmorpholine-N-oxide.

24. Process according to claim 18 wherein the tertiary amine oxide is N-methylmorpholine-N-oxide.

25. Process according to claim 19 wherein the tertiary amine oxide is N-methylmorpholine-N-oxide.

26. Process according to claim 20 wherein the tertiary amine oxide is N-methylmorpholine-N-oxide.

27. Process according to claim 14 or claim 15 further comprising utilizing the stretched cellulosic flat film to make one selected from the group consisting of a packaging material for foodstuffs, a waste bag, a carrier bag, a film for agricultural applications, a film for diapers, a substrate for compounds, a film for use in an office, a film for use in a household, and a membrane to separate substances in mixtures.

*28. Process according to claim 1 or claim 2, further comprising drying the film whilst fixing the film.*

*29. Process according to claim 14 or 15, further comprising drying the film whilst fixing the film.*

* * * * *

UNITED STATES PATENT AND TRADEMARK OFFICE

CERTIFICATE OF CORRECTION

PATENT NO. : RE 38,583 E
DATED : September 14, 2004
INVENTOR(S) : Schlossnikl et al.

It is certified that error appears in the above-identified patent and that said Letters Patent is hereby corrected as shown below:

Column 1,
Line 9, "PCT/AP98/00109" should read -- PCT/AT98/00109 --.
Line 9, "Apr. 21, 1998" should read -- Apr. 24, 1998 --.

Signed and Sealed this

Twenty-fifth Day of October, 2005

JON W. DUDAS
*Director of the United States Patent and Trademark Office*